United States Patent
Frank et al.

[11] Patent Number: 5,177,665
[45] Date of Patent: Jan. 5, 1993

[54] HOUSING AND VEHICULAR SUPPORT FOR PORTABLE COMPUTER

[75] Inventors: Michael J. Frank; James C. Jewel, both of Tampa, Fla.

[73] Assignee: Progressive Insurance Corp., Tampa, Fla.

[21] Appl. No.: 769,962

[22] Filed: Oct. 1, 1991

[51] Int. Cl.⁵ .......................... H05K 7/18; B60R 7/04; A47B 37/00
[52] U.S. Cl. ........................ 361/380; 108/44; 248/918; 439/502; 206/305; 361/427; 361/429; 224/276
[58] Field of Search ................ 312/208, 245; 108/44, 108/50, 161; 224/276, 42.43, 42.44; 248/917, 918; 439/502, 505; 361/380, 390, 391, 392, 393, 394, 395, 399, 427, 429; 206/305, 320

[56] References Cited

U.S. PATENT DOCUMENTS

| | | | |
|---|---|---|---|
| 1,900,325 | 7/1931 | Bayman et al. | 108/45 |
| 4,139,217 | 2/1979 | Jamison | 281/43 |
| 4,345,147 | 8/1982 | Aaron et al. | 235/385 |
| 4,553,788 | 6/1984 | Russell | 108/44 X |
| 4,769,764 | 9/1988 | Levanon | 364/708 |
| 4,788,658 | 11/1988 | Hanebuth | 361/380 |
| 4,797,538 | 1/1989 | Schick | 235/145 R X |
| 4,845,591 | 7/1989 | Pavie | 361/391 |
| 4,909,159 | 3/1990 | Gonsoulin | 108/44 |
| 4,917,130 | 4/1990 | Sweder | 132/288 |
| 4,941,845 | 7/1990 | Eppley et al. | 439/502 X |
| 4,946,120 | 8/1990 | Hatcher | 108/44 X |
| 5,030,128 | 7/1991 | Herron et al. | 364/708 X |
| 5,060,581 | 10/1991 | Malinski | 108/44 |

FOREIGN PATENT DOCUMENTS

| 93398 | 11/1983 | European Pat. Off. | 439/502 |
|---|---|---|---|
| 2-288176 | 11/1990 | Japan | 439/502 |

Primary Examiner—Gerald P. Tolin
Assistant Examiner—Michael W. Phillips
Attorney, Agent, or Firm—Pettis & McDonald

[57] ABSTRACT

A mounting assembly for a small portable computer provides both a housing to receive the computer and releasably attach it to a vehicle steering wheel and connections for supplying electrical power to the computer, with that housing also providing a pivotally movable upper lid which may be closed to cover and protect significant portions of the computer and may be opened to provide for access to the computer.

6 Claims, 2 Drawing Sheets

HOUSING AND VEHICULAR SUPPORT FOR PORTABLE COMPUTER

BACKGROUND OF THE INVENTION

This invention relates to portable computers, and more particularly to apparatus for supporting a portable computer for use in a motor vehicle.

In recent years portable computers have come into increasing use for numerous applications. As these computers have become smaller, now down to the size of an ordinary notebook for a powerful and full featured computer, their applicability for jobs outside the traditional office has increased enormously. Such small, lightweight portable computers are now widely used by businessmen who travel and by persons who operate their businesses from their automobiles, such as salesmen and insurance adjusters.

While the currently available portable computers, particularly those in the "lap top" and "notebook" sizes have provided the functional capabilities needed, persons using those computers in their automobiles have frequently found it inconvenient and awkward to balance the computers either on the seats or one their laps while attempting to enter and process data. The difficulty becomes acute when the computer is attached to additional peripheral equipment, such as a printer, a cellular modem and 12 volt DC power converters that may be installed in the trunk of the vehicle. With such an installation, the various cables connected to the computer make it both awkward to hold and use and subject to damage to the cables or the computer. What has been needed is some convenient apparatus for mounting the computer for use within the vehicle while still retaining the capability for easy removal of the computer for full portability.

SUMMARY OF THE INVENTION

In order to meet the needs of those using portable computers from their automobiles, the present invention provides a vehicular computer mounting assembly for supporting a portable computer on the steering wheel of a vehicle. This assembly includes a housing to receive the computer, which housing comprises a lower support for supportably receiving the computer thereupon and an upper lid pivotally connected to the lower support and pivotally movable between a closed position, substantially covering upward facing portions of the computer and an open portion exposing the upward facing portions of the computer. The mounting assembly further includes apparatus affixed to the housing for releasably attaching the housing to the steering wheel of the vehicle and electrical connection apparatus attached to the lower support for connection to the computer when the computer is received upon the lower support, to provide electrical power to the computer.

BRIEF DESCRIPTION OF THE DRAWINGS

A particularly preferred embodiment of this invention will be described in detail below in connection with the drawings in which.

DETAILED DESCRIPTION OF A PREFERRED EMBODIMENT

Figure 1:
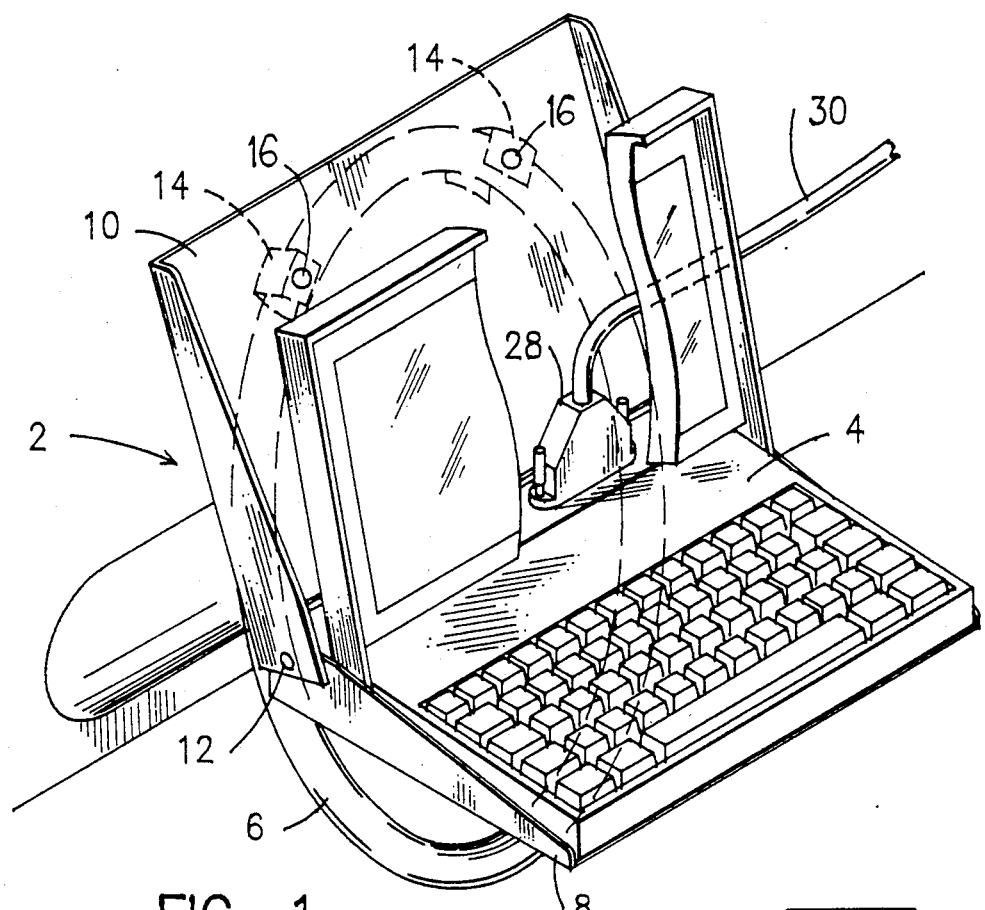
FIG. 1 is a perspective view of the apparatus of this invention illustrating its use with a portable computer and supported on the steering wheel of a vehicle.
Figure 3:
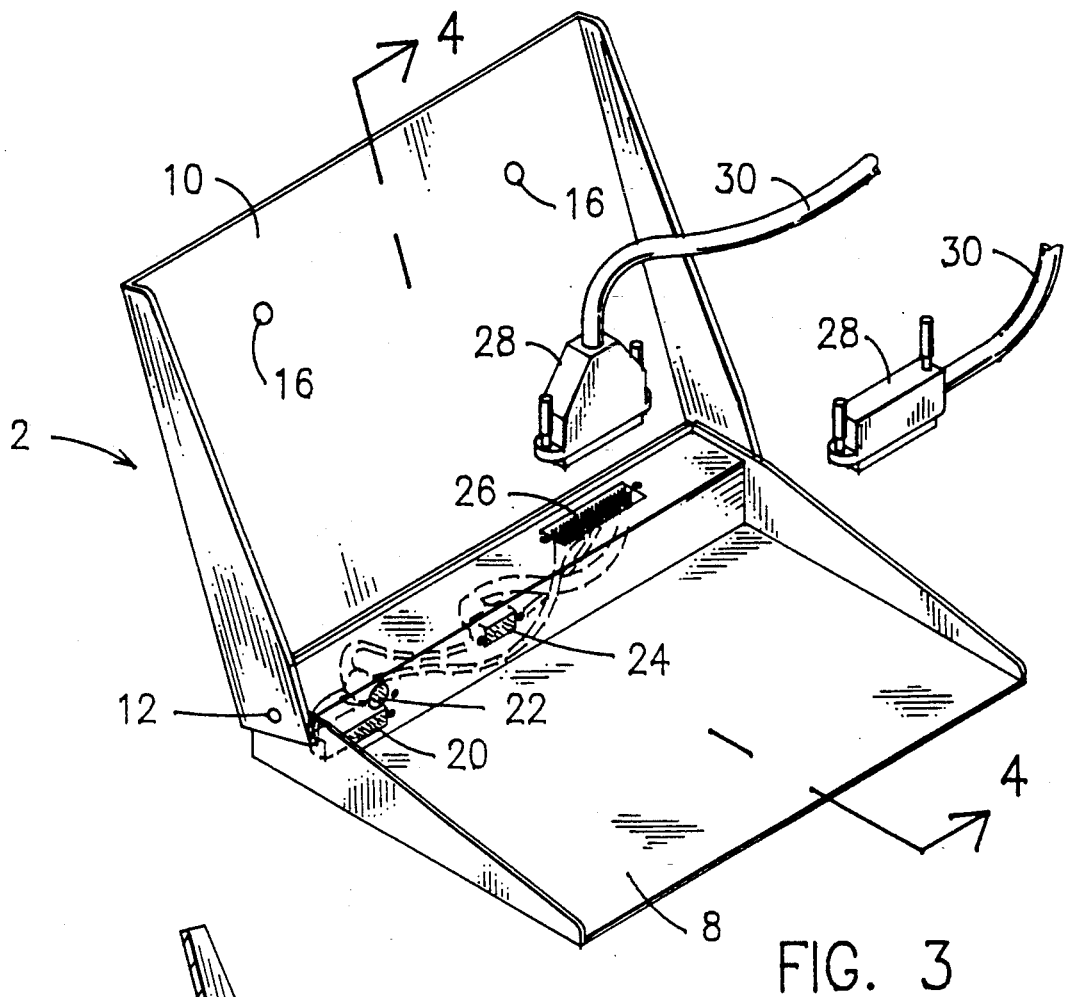
FIG. 3 is a perspective view similar to that of FIG. 1 but without the computer.
Figure 4:
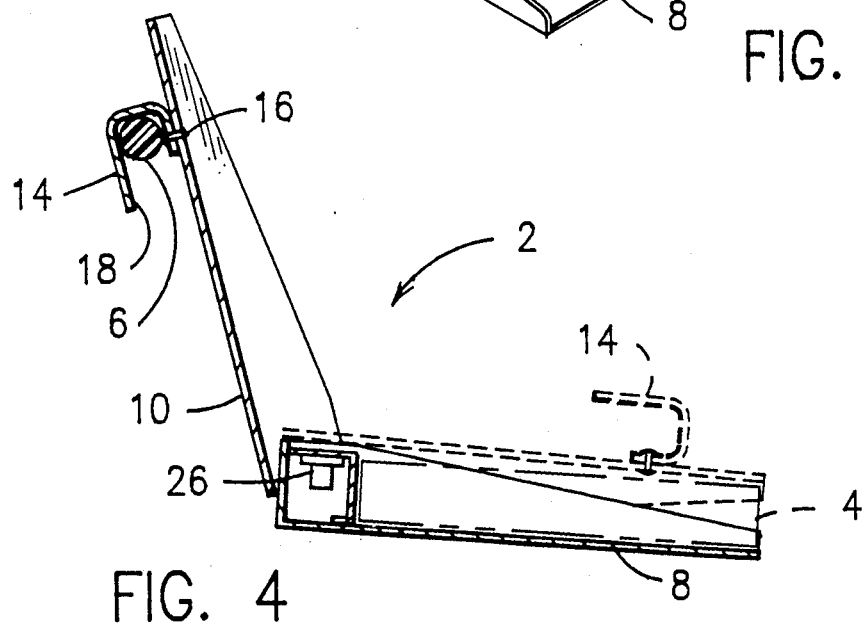
FIG. 4 is a side sectional view taken along lines 4—4 of FIG. 3.

A particularly preferred embodiment of the present invention is illustrated most clearly in the perspective view of FIGS. 1 and 3, as well as in the side sectional view of FIG. 4. This invention comprises a vehicular computer mounting assembly, generally indicated by reference numeral 2, for supporting a small lap top or notebook portable computer 4 on the steering wheel 6 of a vehicle, generally as shown in FIG. 1.

The assembly includes a housing, which may conveniently be formed either of a sheet metal or of a suitable rigid synthetic resin, including a lower support 8 for supportably receiving thereupon and partially surrounding the side portions of the computer 4, and an upper lid 10, pivotally connected by conventional means 12, such as pins or the like, and movable between a closed position, illustrated in the broken line representation of FIG. 4, substantially covering upward facing portions and partially surrounding the side portions of that computer 4 received upon the lower support 8, and an open position, illustrated in the solid line representations of FIGS. 1, 3 and 4, exposing the upward facing portions of the computer.

Affixed to the housing, suitably to the upper lid, are appropriate means for releasably attaching the housing to the steering wheel 6 of the vehicle. These affixing means may suitably be in the form of hooks 14, illustrated in FIGS. 1 and 4, which may conveniently be formed of a suitable metal or rigid synthetic resin and affixed to the upper lid by conventional means 16, such as rivets or bolts. Preferably, the attaching means 16 provide for limited pivotal movement of the hooks 14 to enable them to conform to a tangential relationship with the perimeter of the steering wheel, as shown in FIG. 1. Preferably, the inside of each of the hooks 14 is lined with a cushioning material 18, which may be felt or a suitable resilient synthetic resin.

As shown best in FIG. 3, various electrical connection means, suitably in the form of connectors 20, 22 and 24, are attached to the lower support 8 and preferably positioned to engage mating connectors mounted within the computer 4. Suitably, at least one of these connectors, such as connector 22, may provide electric power to the computer, while other connectors, such as connectors 20 and 24 may connect to the data signal input and output connectors of the computer for conveying such signals between the computer and other electronic apparatus. These connectors are all conventional, suitably of conventional parallel and serial types, and their type and positioning are dictated primarily by the placement of the corresponding connectors on the computer to be utilized with this mounting assembly.

As best shown in FIG. 3, the preferred embodiment of the present invention also provides for the wiring from each of the connectors 20, 22 and 24 to be fed to a single large connector 26, also affixed to the lower support 8. This connector 26 thus provides for reception of a mating connector 28 attached to a cable 30 which provides the interconnection through that single cable 30 between the mounting assembly and its computer and a remote power supply and peripheral devices, generally as indicated schematically in FIG. 2. It may be noted that FIG. 3, solely for purposes of illustration, shows both a conventional connector 28 having the cable exit the rear center of that connector and, alternatively, a low profile connector 28' in which the cable 30 exits the side of that connector. The type of connector used is obviously a matter of choice in providing for the routing of the cable 30. By the use of this single cable leading from the housing, connection and disconnection of the computer to other peripheral equipment may be greatly simplified over such an arrangement utilizing separate cables mating to each of the connectors. Typically, one of the connectors, such as connector 24, will connect to the serial port of the computer, while the other data signal connector, such as connector 20, will mate to a parallel data port on the computer.

Figure 2:
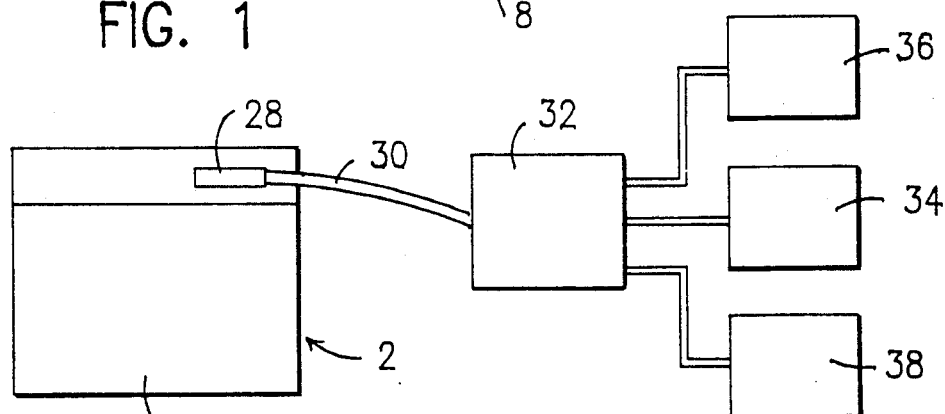
FIG. 2 is a simplified block diagram schematically indicating the electrical connections between the computer mounting assembly and peripheral devices.

As illustrated in the schematic representation of FIG. 2, the cable 30 may connect the computer and mounting assembly to a distribution unit or junction box 32, which provides for connections to various peripheral equipment, which may conveniently include a power supply 34, a printer 36 and a modem 38, which may be a cellular telephone modem, for data transmission. The power supply 34 may suitably be a converter unit to convert the 12 volt D.C. power of the vehicle to suitably conditioned power for the computer.

The foregoing apparatus provides for convenient use of a small portable computer, particularly by persons whose work requires them to travel extensively. For example, a salesman or an insurance claim adjuster, who works largely from his automobile, may carry his portable computer within the computer mounting assembly in its closed configuration, as shown in the broken line presentation of FIG. 4. This provides an additional degree of protection for the computer when it is not in use. When it is necessary to use the computer, the user may either remove the computer from the housing assembly and use it independently or may open the mounting assembly and computer as shown in FIG. 1 and slip the attaching hooks 14 over the steering wheel of the vehicle to create a desk-like arrangement. If desired, various detents may be provided to hold the angular relationship between the upper lid and the lower support. However, it generally is most convenient to have that lid open to an angle with lower support of not less than 90 degrees and preferably slightly more, in view of the angle of tilt conventionally found on vehicle steering wheels. With the case open the user may then plug in the master cable 30 through its connector 28 engaging the mating connector 26 in the mounting assembly and thus provide connection for the vehicle power supply to the computer and for the computer serial and parallel ports to a printer, modem and cellular telephone, if desired. By connecting the serial port of the computer to a modem and cellular telephone, the user may then communicate with other computers at remote locations, such as at a home office or a base facility. Obviously, other peripheral devices may also be connected through the serial and parallel ports to the computer as desired. By providing a central distribution unit or junction box 32, the cabling within the vehicle may be simplified, particularly where some of that equipment, such as the power converter and modem, may conveniently be located in the trunk of the vehicle while other apparatus, such as a printer, may be located in the interior of the vehicle, accessible to the user. When a user has completed his operation of the computer, he may again remove the plug 28 and master cable 30 from connector 26 and then remove the mounting assembly from the steering wheel and close the lid to again provide additional protection to the computer when not in use.

While the foregoing illustrates a particularly preferred embodiment of the apparatus of this invention, this description and the illustrations are to be considered illustrative only of the principles of the invention and are not to be limitative thereof. Numerous modifications and variations of this structure will readily occur to those skilled in the art, particularly where different types of computers having different connectors and configurations are involved and where different peripheral arrangements may be desired. Accordingly, the scope of this invention is to be determined solely by the claims appended hereto.

What is claimed is:

1. A vehicular computer mounting assembly for supporting on the steering wheel of a vehicle a portable computer having a front portion, a rear portion and side portions extending therebetween, said mounting assembly comprising a housing to receive a computer, said housing comprising a lower support for supportably receiving a computer thereupon, said lower support including a front portion, a rear portion and lower support sidewalls extending therebetween, said lower support sidewalls partially surrounding side portions of a computer and tapering from a first height proximal said rear portion of said lower support to a second, lower height proximal said front portion of said lower support, and an upper lid pivotally connected to said lower support and pivotally movable between a closed position and an open position, said upper lid including a front portion, a rear portion and upper lid sidewalls extending therebetween, said upper lid sidewalls tapering from a first height proximal said rear portion of said upper lid to a second, lower height proximal said front portion of said upper lid whereby, when the upper lid is moved to the closed position, the lower support and the upper lid together form a protective case which is open at the front portion, said protective case partially surrounding a computer received on the lower support, and, when the upper lid is moved to the open position, the upward facing portions of a computer received upon the lower support are exposed to permit operation of the computer, and means affixed to said housing for releasably attaching said housing to a steering wheel, whereby, when the housing is in the open position and is attached to a vehicle steering wheel, the housing may be used as a support for a computer for operation and use.

2. The vehicular computer mounting assembly of claim 1 further comprising electrical connection means having a single cable for connection to said computer for both providing electrical power to said computer and for conducting data signals between said computer and other electronic apparatus within said vehicle.

3. The vehicular computer mounting assembly of claim 2 wherein said electrical connection means comprises a plurality of connectors connected to said single cable and engaging connectors attached to said computer.

4. The vehicular computer mounting assembly of claim 2 wherein said electrical connection means comprises
- a plurality of connectors affixed to said lower support for engagement with corresponding connectors on said computer, and
- a single connector affixed to said lower support for connection to said cable for supplying power to said computer and for conducting said data signals between said computer and said other electronic apparatus, and
- means interconnecting said single connector with said plurality of connectors, whereby all electrical connections between the computer and other electronic apparatus within the vehicle are carried by that cable and single connector.

5. The vehicular computer mounting assembly of claim 1 wherein said releasable attaching means comprise hook means affixed to said upper lid for engaging portions of a steering wheel, whereby the assembly may be hooked onto the steering wheel.

6. The vehicular computer mounting assembly of claim 1 wherein said upper lid, when in said open position, is at an angle with said lower support of not less than 90 degrees.

* * * * *